(12) United States Patent
Jin

(10) Patent No.: US 10,475,264 B2
(45) Date of Patent: Nov. 12, 2019

(54) APPLICATION METHOD OF BLUETOOTH LOW-ENERGY ELECTRONIC LOCK BASED ON BUILT-IN OFFLINE PAIRING PASSWORDS, INTERACTIVE UNLOCKING METHOD OF A BLUETOOTH ELECTRONIC LOCK AND ELECTRONIC LOCK SYSTEM

(71) Applicant: Q & K International Group Limited, Grand Cayman (KY)

(72) Inventor: Guangjie Jin, Shanghai (CN)

(73) Assignee: Q & K International Group Limited, Grand Cayman (KY)

( * ) Notice: Subject to any disclaimer, the term of this patent is extended or adjusted under 35 U.S.C. 154(b) by 0 days.

(21) Appl. No.: 16/017,587

(22) Filed: Jun. 25, 2018

(65) Prior Publication Data
US 2019/0172285 A1   Jun. 6, 2019

(30) Foreign Application Priority Data
Aug. 14, 2017   (CN) .......................... 2017 1 0691105

(51) Int. Cl.
*G07C 9/00* (2006.01)
*H04L 9/30* (2006.01)

(52) U.S. Cl.
CPC ..... *G07C 9/00182* (2013.01); *G07C 9/00015* (2013.01); *H04L 9/30* (2013.01);
(Continued)

(58) Field of Classification Search
CPC . G07C 9/00; G06K 19/06; G06K 9/00; G06F 21/31; H04L 9/30; B60R 25/20; B60R 25/24
(Continued)

(56) References Cited

U.S. PATENT DOCUMENTS

| 7,012,503 B2* | 3/2006 | Nielsen .............. G07C 9/00103 340/5.6 |
| 9,025,769 B2* | 5/2015 | Choi .................... H04W 12/06 380/247 |

(Continued)

FOREIGN PATENT DOCUMENTS

| CN | 202658086 U | 1/2013 |
| CN | 104261897 A | 1/2015 |

(Continued)

OTHER PUBLICATIONS

International Search Report dated Apr. 18, 2018 for PCT/CN2017/116013.
(Continued)

*Primary Examiner* — Nam V Nguyen
(74) *Attorney, Agent, or Firm* — Suiter Swantz pc llo

(57) ABSTRACT

An application method of a Bluetooth low-energy electronic lock based on built-in offline pairing passwords, an interactive unlocking method of a Bluetooth electronic lock, and an electronic lock system are provided, wherein data propagation of some public keys or public addresses is carried out through a scanning response packet of a broadcast packet, the mobile phone APPs run in a Bluetooth server mode, the Bluetooth electronic lock works in a Bluetooth client mode, the Bluetooth electronic lock periodically sends a broadcast packet of a random address, and the Bluetooth electronic lock has a set of temporary door-opening passwords of random algorithm built in after manufacture; and during the initialization process, the Bluetooth electronic lock uploads the built-in temporary door-opening password set, with the random algorithm, through the relational data of application services and the public address of the Bluetooth electronic lock.

20 Claims, 5 Drawing Sheets

(52) U.S. Cl.
CPC ............... *G07C 2009/0019* (2013.01); *G07C 2009/00253* (2013.01); *G07C 2009/00769* (2013.01)

(58) Field of Classification Search
USPC .... 340/5.64, 5.65, 5.6, 5.61; 455/557, 550.1
See application file for complete search history.

(56) References Cited

U.S. PATENT DOCUMENTS

| | | | |
|---|---|---|---|
| 9,248,807 B2* | 2/2016 | Lee | B60R 25/2018 |
| 9,519,824 B2* | 12/2016 | Fondeur | G06F 21/31 |
| 9,640,002 B1* | 5/2017 | Grosberg | G07C 9/00174 |
| 9,990,787 B2* | 6/2018 | Capaldi-Tallon | G07C 9/00039 |
| 2009/0288159 A1* | 11/2009 | Husemann | G09C 5/00 726/16 |
| 2012/0254960 A1* | 10/2012 | Lortz | H04L 63/104 726/7 |
| 2013/0257590 A1* | 10/2013 | Kuenzi | G05B 1/01 340/5.65 |
| 2014/0087179 A1 | 3/2014 | Takano et al. | |
| 2016/0180618 A1* | 6/2016 | Ho | G07C 9/00563 340/5.52 |
| 2017/0345236 A1* | 11/2017 | Kuenzi | G07C 9/00904 |

FOREIGN PATENT DOCUMENTS

| | | |
|---|---|---|
| CN | 105600173 A | 5/2016 |
| CN | 106396741 A | 2/2017 |
| CN | 107265861 A | 10/2017 |
| CN | 107265865 A | 10/2017 |
| CN | 107285737 A | 10/2017 |
| CN | 107285812 A | 10/2017 |
| CN | 107311457 A | 11/2017 |
| CN | 107365080 A | 11/2017 |
| CN | 107382377 A | 11/2017 |
| CN | 107399911 A | 11/2017 |
| JP | 2014069098 A | 4/2014 |

OTHER PUBLICATIONS

Written Opinion of the International Search Report dated Apr. 18, 2018 for PCT/CN2017/116013.

* cited by examiner

| INDEX | KEY |
|---|---|
| ea76 | d1ed634a-a8d3-439f-8c26-502e433995e1 |
| ef76 | 4f46785f-805d-4ff5-bb86-9fe7497a1764 |
| f0f2 | 7cdc6736-0a9a-4392-9535-142182d4ef80 |
| f2fa | d5372587-ec53-45ea-bbbd-b63f80fe4952 |
| f462 | 2e83c9a3-78e5-4146-9c02-5dbe1141a07f |
| f5a2 | 4fb3ed11-26bd-432e-93f1-f11d095eae37 |
| f6d8 | f1338ca5-ebda-4553-8bbb-cf7cbde46f65 |
| f80e | c130c4f9-3632-495b-b97b-a152d3990f7a |
| fbec | 6e2a1e3b-6335-4fe1-9fee-4364f5d2ed72 |
| fd2c | b7a8eb05-935b-47d7-a99d-8494d5f7dca9 |
| fe62 | 9d26a7ce-b82a-4372-b1fc-83defd389c08 |
| ff98 | 8fac2999-d1c0-450c-83b0-f6a09634c6c9 |
| 00ce | 67581329-87e1-417f-a9c6-8113bc22df33 |
| 6294 | a920d9f1-9b43-4633-8896-9e062671e937 |
| 632 | b99ffd33-0542-40c2-8658-a26549ad57b8 |
| 808 | fc14ad7c-eada-4ebc-ba2f-66df44cf2a60 |
| 970 | 87293968-466b-40ed-bd1e-eb1cd443fd24 |
| 0aa6 | 71a87c0e-7c08-45bb-81d7-ae6922663599 |
| 0be6 | 69eed70a-a8d0-4411-aa0d-a1af1d734dea |
| 0d26 | 61d6f237-1f76-4e21-a361-99f615de9236 |

FIG. 2

APPLICATION METHOD OF BLUETOOTH LOW-ENERGY ELECTRONIC LOCK BASED ON BUILT-IN OFFLINE PAIRING PASSWORDS, INTERACTIVE UNLOCKING METHOD OF A BLUETOOTH ELECTRONIC LOCK AND ELECTRONIC LOCK SYSTEM

CROSS-REFERENCE TO RELATED APPLICATIONS

The present application claims the priority to Chinese Patent Application No. 201710691105.X, filed with China Patent Office on Aug. 14, 2017 and entitled "Application Method of Bluetooth Low-energy Electronic Lock Based on Built-in Offline Pairing Password", which is incorporated herein by reference in its entirety.

TECHNICAL FIELD

The present disclosure relates to the technical field of electronic locks, and particularly to an application method of a Bluetooth low-energy electronic lock based on built-in offline pairing passwords, an interactive unlocking method of a Bluetooth electronic lock, and an electronic lock system.

BACKGROUND

Bluetooth wireless technology adopts adaptive frequency hopping, minimizing the crosstalk with other wireless technologies of 2.4 GHz ISM frequency band. After Bluetooth 4.0, a Bluetooth Low Energy (BLE) technology has been added, which makes Bluetooth communication widely applicable to intelligent hardware devices of the Internet of Things, for example, a Bluetooth electronic lock is one of the typical applications. A Bluetooth electronic lock is an electronic lock that can be controlled through Bluetooth communication. A user can establish Bluetooth communication with the Bluetooth lock through a mobile terminal and control the Bluetooth electronic lock to unlock or lock after some procedures of password or identity authentication. However, due to certain security vulnerabilities in the pairing procedures of Bluetooth 4.2 per se, the AES-CCM encryption technology adopted by Bluetooth 4.2 can hardly ensure that two paired devices provide an exchange key without being read by a passive receiver a few meters away, and as a result, there is a certain risk in the interactive unlocking process of the Bluetooth electronic lock.

SUMMARY

Embodiments of the present disclosure provide an application method of a Bluetooth low-energy electronic lock based on built-in offline pairing passwords, wherein the mobile phone APP runs in a Bluetooth server mode, the Bluetooth electronic lock works in a Bluetooth client mode, the Bluetooth electronic lock periodically sends a broadcast packet with a random address, and the Bluetooth electronic lock achieves temporary door opening through a set of built-in random algorithms when leaving the factory, in order to overcome at least one of the defects existing in the prior art.

In a first aspect, the present disclosure provides an application method of a Bluetooth low-energy electronic lock based on built-in offline pairing passwords, specifically comprising the steps of:

Step 1, initializing a built-in temporary password set of a Bluetooth electronic lock after the Bluetooth electronic lock leaves a factory;

a) uploading a universally unique identifier (UUID), geographic address/location information and installation time of the electronic lock device through an APP for configuration in a mobile phone;

b) a cloud server generating 100 sets of 16-bit temporary passwords through an obfuscation algorithm; and c) downloading the 100 sets of temporary passwords and storing the same in an on-chip memory of the Bluetooth electronic lock through the APP for configuration in the mobile phone;

Step 2, the Bluetooth electronic lock broadcasting a random device address periodically during use;

Step 3, a mobile-phone temporary-door-opening APP initiating a device scanning request of the Bluetooth electronic lock;

Step 4, the Bluetooth electronic lock returning to the mobile-phone temporary-door-opening APP an index number of the temporary door-opening password, with the index number having 2 bytes arranged in a disordered manner;

Step 5, the mobile-phone temporary-door-opening APP querying a currently used temporary door-opening password from the cloud server through the index number;

Step 6, the cloud server returning a preset temporary door-opening password and a UUID and a unique public address of an electronic lock corresponding to the geographic address/location information through a database;

Step 7, performing pairing-free device connection through the public address, and the mobile-phone temporary-door-opening APP initiating a device service discovery request, with the service discovery request having a message data segment carrying the UUID and the temporary door-opening password;

Step 8, the electronic lock receiving the UUID and the temporary door-opening password, and making a comparison with the temporary door-opening password currently in use; and Step 9, the electronic lock scrolling, after a door is temporarily opened successfully, a temporary-door-opening-password index table and invalidating the previous temporary door-opening password.

In a second aspect, the present disclosure provides an interactive unlocking method of a Bluetooth electronic lock, applied to an electronic lock system comprising a cloud server, a mobile terminal and a Bluetooth electronic lock, wherein the Bluetooth electronic lock and the cloud server pre-store the same password table, in which multiple sets of passwords and index numbers corresponding to the respective sets of passwords are recorded. The method comprises the steps of:

the mobile terminal sending a device scanning request to a Bluetooth electronic lock corresponding to the mobile terminal through Bluetooth communication;

the Bluetooth electronic lock receiving the device scanning request, selecting one set of valid passwords from the pre-stored multiple sets of passwords as a first password, and sending the index number of the first password to the mobile terminal;

the mobile terminal sending the received index number to the cloud server;

the mobile terminal receiving a second password corresponding to the index number, which is responded by the cloud server according to the index number, and sending the second password to the Bluetooth electronic lock; and the Bluetooth electronic lock determining by comparison whether the first password conforms to the second password, wherein if the first password conforms to the second password, an unlocking action is performed, and the password used for the current unlocking action is identified as invalid or deleted.

In a third aspect, the present disclosure provides an electronic lock system, comprising a cloud server, a mobile terminal and a Bluetooth electronic lock, wherein the Bluetooth electronic lock and the cloud server pre-store the same password table, in which multiple sets of passwords and index numbers corresponding to respective sets of passwords are recorded; and when performing interactive unlocking, the mobile terminal sends a device scanning request to a Bluetooth electronic lock corresponding to the mobile terminal through Bluetooth communication, the Bluetooth electronic lock receives the device scanning request, selects one set of valid passwords from the pre-stored multiple sets of passwords as a first password, and sends an index number of the first password to the mobile terminal, the mobile terminal sends the received index number to the cloud server, the mobile terminal receives a second password corresponding to the index number, which is responded by the cloud server according to the index number, and sends the second password to the Bluetooth electronic lock, and the Bluetooth electronic lock determines by comparison whether the first password conforms to the second password, wherein if the first password conforms to the second password, an unlocking action is performed, and the password used for the current unlocking action is identified as invalid or deleted.

BRIEF DESCRIPTION OF DRAWINGS

FIG. 2 is a schematic diagram of passwords and indices according to embodiments of the present disclosure.

DETAILED DESCRIPTION OF EMBODIMENTS

Figure 1:
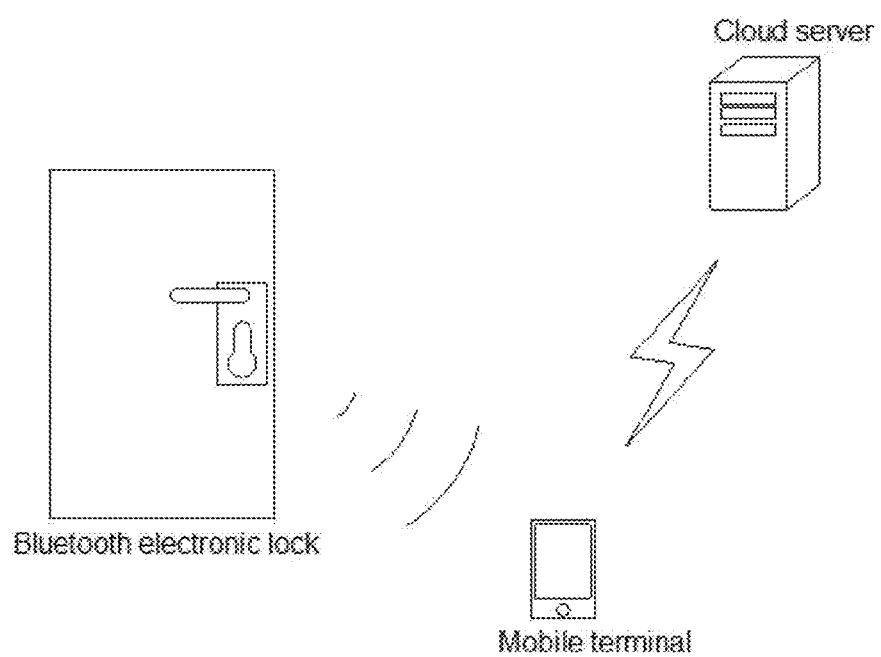
FIG. 1 is a schematic diagram of an electronic lock system according to embodiments of the present disclosure.

The technical solutions in the embodiments of the present disclosure will be clearly and completely described below with reference to the drawings of the embodiments of the present disclosure. Obviously, the embodiments described are merely some of the embodiments of the present disclosure, rather than all of the embodiments of the present disclosure. Thus, the following detailed description of the embodiments of the present disclosure provided in the drawings is not intended to limit the scope of the present disclosure as claimed, but is merely representative of the selected embodiments of the present disclosure. All the other embodiments that are obtained by a person of ordinary skill in the art based on the embodiments of the present disclosure without creative efforts shall be within the protection scope of the present disclosure.

It should be noted that like reference numerals and letters denote like items in the drawings, and therefore, once a certain item is defined in one figure, it does not need to be further defined and explained in the subsequent figures.

In the description of the present disclosure, it should be noted that the terms, such as "first", "second", "third" and the like, are only used to distinguish elements in the description and cannot be interpreted as an indication or implication of importance in relativity.

In the description of the present disclosure, it should be further noted that the terms "arrange", "install", "link" and "connect" shall be understood in broad sense unless otherwise explicitly specified and defined, which may, for example, refer to fixed connection, detachable connection or integral connection; may refer to mechanical connection or electrical connection; may refer to direct connection or indirect connection by means of an intermediate medium, and may refer to internal communication between two elements. A person of ordinary skill in the art could understand the specific meaning of the above terms in the present disclosure according to specific situations.

The inventor found through researches that in the prior art, in order to ensure the security of the transmission of door-opening password data of a Bluetooth door lock, asymmetric encryption is typically used, however, the interaction of asymmetric encryption is complex, the implementation cost is high, and the timeliness is poor, resulting in poor user experience.

Therefore, in the present embodiment, an implementation solution of a Bluetooth electronic lock with built-in offline pairing passwords is provided, and the solution provided by the present embodiment is set forth in detail below.

Referring to FIG. 1, the present embodiment provides an electronic lock system, which comprises a Bluetooth electronic lock, a mobile terminal and a cloud server. Among these, the mobile terminal can be, but is not limited to, a smartphone, a personal computer (PC), a tablet computer, a personal digital assistant (PDA), a mobile internet device (MID), etc. The Bluetooth electronic lock can be, but is not limited to, room door and window locks, a vehicle lock, a cabinet lock, etc.

The Bluetooth electronic lock can conduct Bluetooth communication with the mobile terminal, and the cloud server can communicate with the mobile terminal. In general, considering the power consumption or on-site implementation environment, the Bluetooth electronic lock usually does not directly communicate with the cloud server.

In the present embodiment, the cloud server pre-generates a password table for the Bluetooth electronic lock. Referring to FIG. 2, in the password table, multiple sets of passwords and indices corresponding to respective sets of the passwords are recorded, wherein the indices of the passwords are randomly generated, namely, there is no relationship between an index and a password, and it is impossible to reversely infer a password from an index. When the Bluetooth electronic lock leaves the factory or is manufactured, the password table can be stored in a non-volatile readable storage medium of the Bluetooth electronic lock through the Bluetooth communication between the mobile terminal and the Bluetooth electronic lock, so that the Bluetooth electronic lock and the cloud server pre-store the same password table.

In one example, the cloud server can pre-record a corresponding relationship between the mobile terminal and the Bluetooth electronic lock, for example, the mobile terminal can apply, to the cloud server, for registration of an unlocking permission on a certain Bluetooth electronic lock in advance, and after the application is approved, the cloud server records the corresponding relationship between the mobile terminal and the Bluetooth electronic lock.

Figure 3:
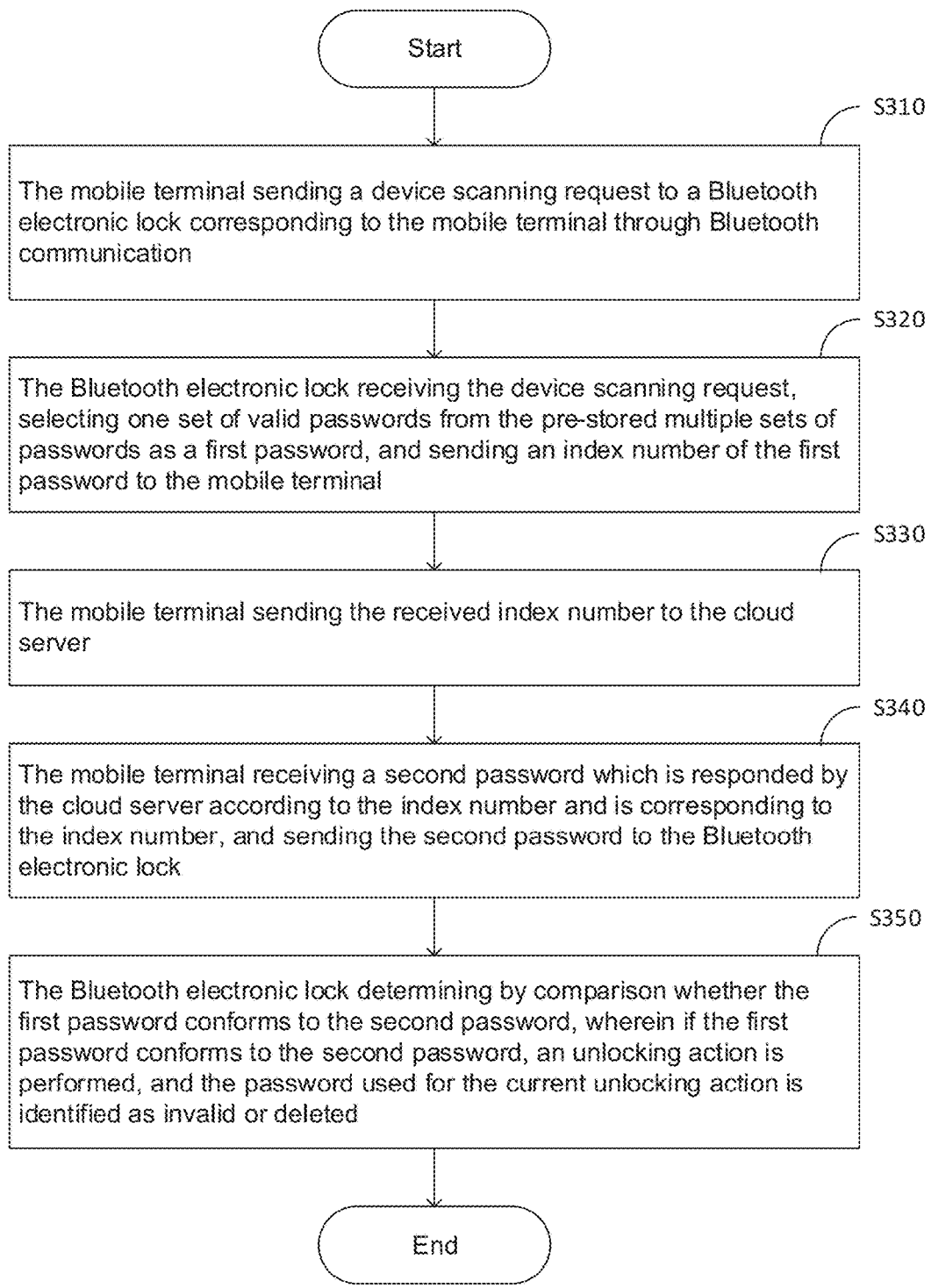
FIG. 3 is a schematic flowchart of an interactive unlocking method of a Bluetooth electronic lock according to embodiments of the present disclosure.

Referring to FIG. 3, this embodiment provides an interactive unlocking method of a Bluetooth electronic lock, applied to the aforesaid electronic lock system, and the steps of the method are set forth in detail below.

Step S310, the mobile terminal sends a device scanning request to a Bluetooth electronic lock corresponding to the mobile terminal through Bluetooth communication.

In the present embodiment, the Bluetooth electronic lock can broadcast a Bluetooth address of its own periodically, and the mobile terminal receives the address broadcasted by the Bluetooth electronic lock and initiates a device scanning request to the Bluetooth electronic lock according to the Bluetooth communication process.

Step S320, the Bluetooth electronic lock receives the device scanning request, selects one set of valid passwords from the pre-stored multiple sets of passwords as a first password, and sends an index number of the first password to the mobile terminal.

In the present embodiment, after receiving the device scanning request, the Bluetooth device selects one set of valid passwords from the pre-stored multiple sets of passwords as a first password, and then as to the scanning request, replies to the mobile terminal with a scanning response, with the scanning response carrying an index number of the first password.

Step S330, the mobile terminal sends the received index number to the cloud server.

After receiving the index number, the mobile terminal can send the index number to the cloud server through Wi-Fi or cellular network communication.

Step S340, the mobile terminal receives a second password corresponding to the index number, wherein the second password is responded by the cloud server according to the index number; and sends the second password to the Bluetooth electronic lock.

The cloud server looks up, according to the index number, the corresponding second password in the password table of the Bluetooth electronic lock associated with the mobile terminal, and sends the same to the mobile terminal.

After receiving the second password, the mobile terminal sends the same to the Bluetooth electronic lock through Bluetooth communication.

Step S350, the Bluetooth electronic lock determines by comparison whether the first password conforms to the second password. If the first password conforms to the second password, an unlocking action is performed, and the password used for the current unlocking action is identified as invalid or deleted.

After receiving the second password, the Bluetooth electronic lock compares the second password with the currently used first password. If the first password conforms to the second password, it is determined that the mobile terminal sending the second password is credible, and an unlocking action is performed. After unlocking, the password used for the unlocking action this time is identified as invalid or deleted.

On the basis of the above design, by pre-storing offline passwords in the Bluetooth electronic lock in advance, the mobile terminal may query the server about an unlocking password according to the password index, and the used password is invalidated after each unlocking is successfully performed. In this way, even if one unlocking password is stolen by a malicious user during one unlocking process, the unlocking password cannot be used in the next unlocking process, which ensures the security of the unlocking process.

Optionally, in order to ensure the privacy of the address of the Bluetooth electronic lock, in Step S310 of this embodiment, the Bluetooth electronic lock broadcasts the random device address thereof periodically, and the mobile terminal receives the random device address broadcast by the Bluetooth electronic lock, and sends a scanning request to the Bluetooth electronic lock according to the random device address.

In Step S340, the mobile terminal receives the second password which is responded by the cloud server according to the index number and is corresponding to the index number, and a public address of the Bluetooth electronic lock. The mobile terminal initiates a service discovery request carrying the second password to the Bluetooth electronic lock according to the public address.

In Step S350, if the Bluetooth electronic lock detects that the second password is carried in the service discovery request and the second password conforms to the first password, it is considered that the service discovery request is a service discovery request used for performing a door opening action. After performing the door opening action, the Bluetooth electronic lock replies to the mobile terminal with a service discovery response, with the service discovery response carrying door-opening success information.

If the Bluetooth electronic lock detects that no second password is carried in the service discovery request, or the carried second password does not conform to the pre-stored first password, it is considered that the service discovery request may not be a service discovery message used for performing the door opening action, and the Bluetooth electronic lock may continue to perform Bluetooth pairing interaction of other stages after the service discovery stage.

In this way, only the mobile terminal associated with the Bluetooth electronic lock can obtain the public address of the Bluetooth electronic lock, which prevents the real address of the Bluetooth electronic lock from being revealed, and therefore ensures the security of the Bluetooth electronic lock.

Optionally, for the sake of more reliable verification of the mobile terminal by the Bluetooth electronic lock, in Step S340 of this embodiment, in addition to the second password which is responded by the cloud server according to the index number and is corresponding to the index number, the mobile terminal also receives the UUID of the Bluetooth electronic lock which is responded by the cloud server and bound to the mobile terminal, and sends the second password and the UUID to the Bluetooth electronic lock.

Then, in Step S350, the Bluetooth electronic lock determines, by comparison, whether the first password conforms to the second password and whether the UUID sent by the mobile terminal conforms to the UUID of the Bluetooth electronic lock itself.

If the first password conforms to the second password and the UUID sent by the mobile terminal conforms to the UUID of the Bluetooth electronic lock itself, an unlocking action is performed.

In this way, in addition to verifying the second password, the Bluetooth electronic lock also verifies the conformity of the UUID sent by the mobile terminal with the UUID of the Bluetooth electronic lock itself, which improves the reliability of verification.

Optionally, in order to prevent a malicious mobile terminal from frequently initiating password verification to the Bluetooth electronic lock to try to decrypt the password violently, in Step S350 of this embodiment, if the first password does not conform to the second password, it is recorded that comparison of the mobile terminal is unsuccessful. When the recorded number of times of unsuccessful comparison of the mobile terminal reaches a preset number, the communication with the mobile terminal is terminated, and the communication with the mobile terminal is refused to be established for a preset duration.

Optionally, in this embodiment, after the unlocking action is performed, a successful unlocking prompt is sent to the mobile terminal.

According to the regulations of Bluetooth communication, pairing can be performed between the Bluetooth devices between which mutual communication has been established, so as to enable faster establishment of connection between them for the next time. However, in this embodiment, if the Bluetooth electronic lock is paired to the mobile terminal, it may result in that some steps in this embodiment may be skipped in the next unlocking process. Thus, in this embodiment, in Step S350, when it is detected that the first password conforms to the second password, the Bluetooth electronic lock may not perform an operation of pairing to the mobile terminal and may directly perform the unlocking action, and identify the password used for the current unlocking action as invalid or delete it.

Figure 4:
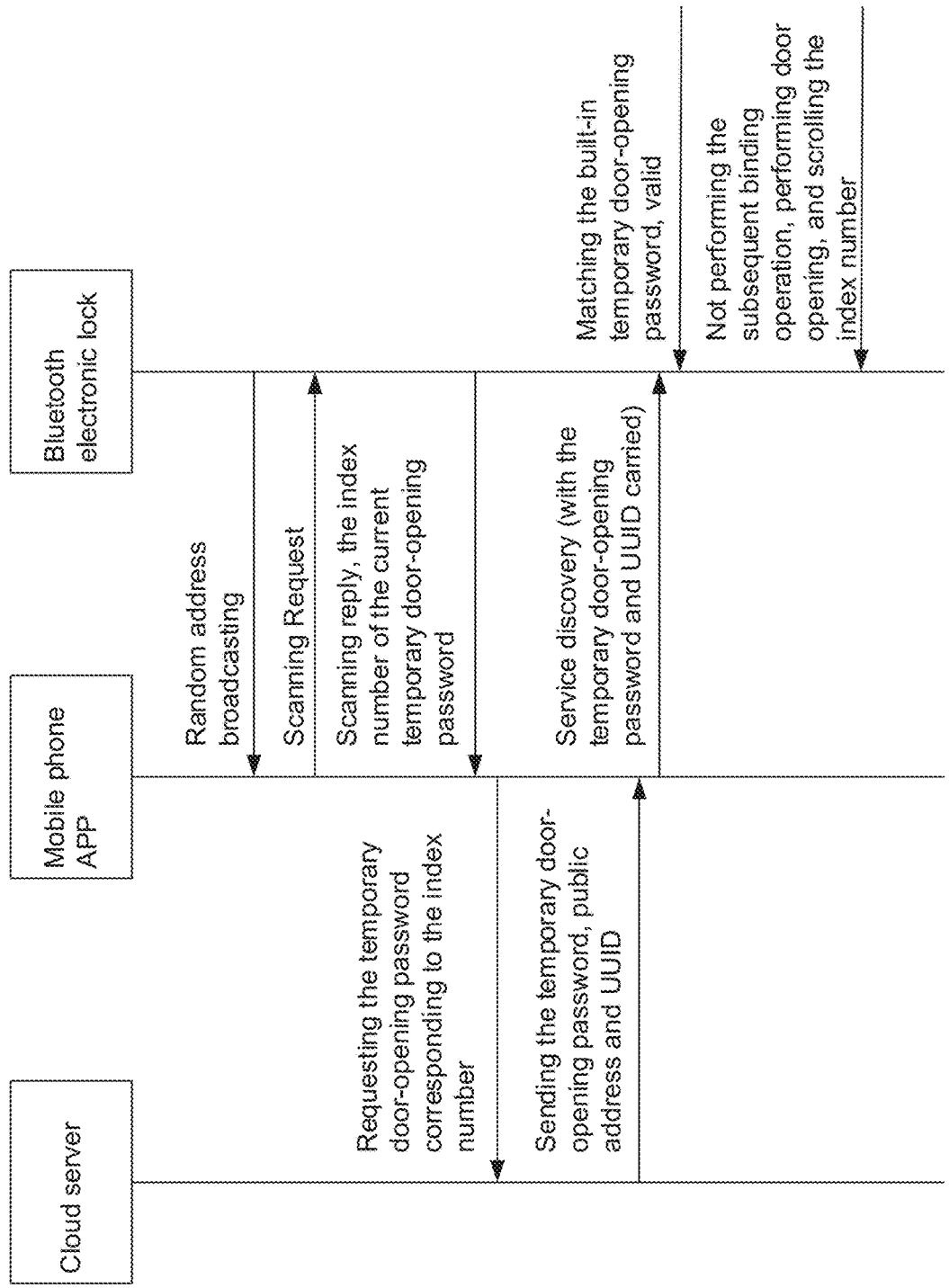
FIG. 4 is a flowchart of an application method of a Bluetooth low-energy electronic lock based on built-in offline pairing passwords according to embodiments of the present disclosure.

With regard to the application of the Bluetooth electronic lock or electronic lock system provided by the present embodiment, referring to FIG. 4, the present embodiment further provides an application method of a Bluetooth low-energy electronic lock based on built-in offline pairing passwords, specifically comprising the steps of:

Step 1, initializing a built-in temporary password set of a Bluetooth electronic lock after the Bluetooth electronic lock leaves the factory;

a) uploading an UUID, geographic address/location information and installation time of the electronic lock device through an APP for configuration in a mobile phone;

b) a cloud server generating 100 sets of 16-bit temporary passwords through an obfuscation algorithm; and c) the APP for configuration in the mobile phone downloading the 100 sets of temporary passwords and storing the same in an on-chip memory of the Bluetooth electronic lock;

Step 2, the Bluetooth electronic lock broadcasting a random device address periodically when in use;

Step 3, a mobile-phone temporary-door-opening APP initiating a device scanning request of the Bluetooth electronic lock;

Step 4, the Bluetooth electronic lock returning to the mobile-phone temporary-door-opening APP an index number of the temporary door-opening password, with the index number having 2 bytes arranged in a disordered manner;

Step 5, the mobile-phone temporary-door-opening APP querying a currently used temporary door-opening password from the cloud server through the index number;

Step 6, the cloud server returning through a database a preset temporary door-opening password and a UUID and the unique public address of the electronic lock corresponding to the geographic address/location information;

Step 7, performing pairing-free device connection through the public address, and the mobile-phone temporary-door-opening APP initiating a device service discovery request, with the service discovery request having a message data segment carrying the UUID and the temporary door-opening password;

Step 8, the electronic lock receiving the UUID and the temporary door-opening password and making comparison with the currently-used temporary door-opening password. Specifically, if the comparison is successful, the door opening operation is performed directly, and a service discovery reply message containing door-opening success information data is returned to the mobile-phone temporary-door-opening APP; and if the comparison is unsuccessful, the service discovery request message, deemed as a normal (common) service discovery request message, is processed; and if the comparison fails consecutively for three times, the electronic lock actively terminates the connection, and refuses the same device for 10 minutes; and Step 9, the electronic lock, after a door is temporarily opened successfully, scrolling a temporary-door-opening-password index table and invalidating the previous temporary door-opening password.

In this embodiment, it should be noted that BLE (Bluetooth Low Energy) technology is a robust wireless technology that is low-cost, short-range and interoperable, which operates in a license-free 2.4 GHz ISM radio frequency band. It is initially designed as a wireless technology of ultra-low power (ULP). It minimizes the power consumption by utilizing many intelligent means, and performs data packet encryption and authentication by using an AES-128 CCM encryption algorithm.

AES-128 CCM: Advanced Encryption Standard (AES) is a block encryption standard adopted by Federal Government of the United State. This standard is used for replacing the original Data Encryption Standard (DES), which has been accepted by multiple parties and widely used throughout the world. Rijndael uses a substitution-permutation network, rather than the Feistel architecture. AES enables quick encryption and decryption on both software and hardware, is relatively easy to implement, and only requires a little memory. As a new encryption standard, AES is currently being deployed and applied to a broader range. AES-128 CCM is a CCM (Counter with Cipher Block Chaining-Message Authentication Code) mode using a 128-bit key, which is a brand new operation mode providing both the encryption and authentication services. It provides an encryption service with authentication and will not incur "Error Propagation", and it has parallelizability during the encryption process, but does not have the parallelizability during the authentication process.

Specifically, a BLE device can use two types of addresses, i.e., a public address and a random address, wherein the random address is further classified into a static address and a private address; and the private address is classified into two types, i.e. a resolvable address and a non-resolvable address, and resolving (parsing) requires that a connection key is bound.

The Bluetooth electronic lock periodically and randomly selects a new broadcast (BD) address for broadcasting, and sends, only after establishing a connection with a trusted host, the real BD address to the host. It is impossible for an observer who wants to track a Bluetooth 4.2 peripheral device that sends broadcast to find out the real BD address on the basis of the randomly selected addresses. Moreover, tracking of the address can only last until the device selects a new address.

Meanwhile, in the present embodiment, data propagation of some of the public keys or public addresses is carried out through a scanning response data packet of a broadcast packet. The mobile phone APP runs in a Bluetooth server mode, the Bluetooth electronic lock works in a Bluetooth client mode, the Bluetooth electronic lock periodically sends a broadcast packet of a random address, and the Bluetooth electronic lock has a set of temporary door-opening passwords of random algorithm built in after its manufacture. In the initialization process, the Bluetooth electronic lock uploads the built-in temporary door-opening password set, with the random algorithm, through the relationship data of application services and the public address of the Bluetooth electronic lock, e.g. the validity period for door opening.

Figure 5:
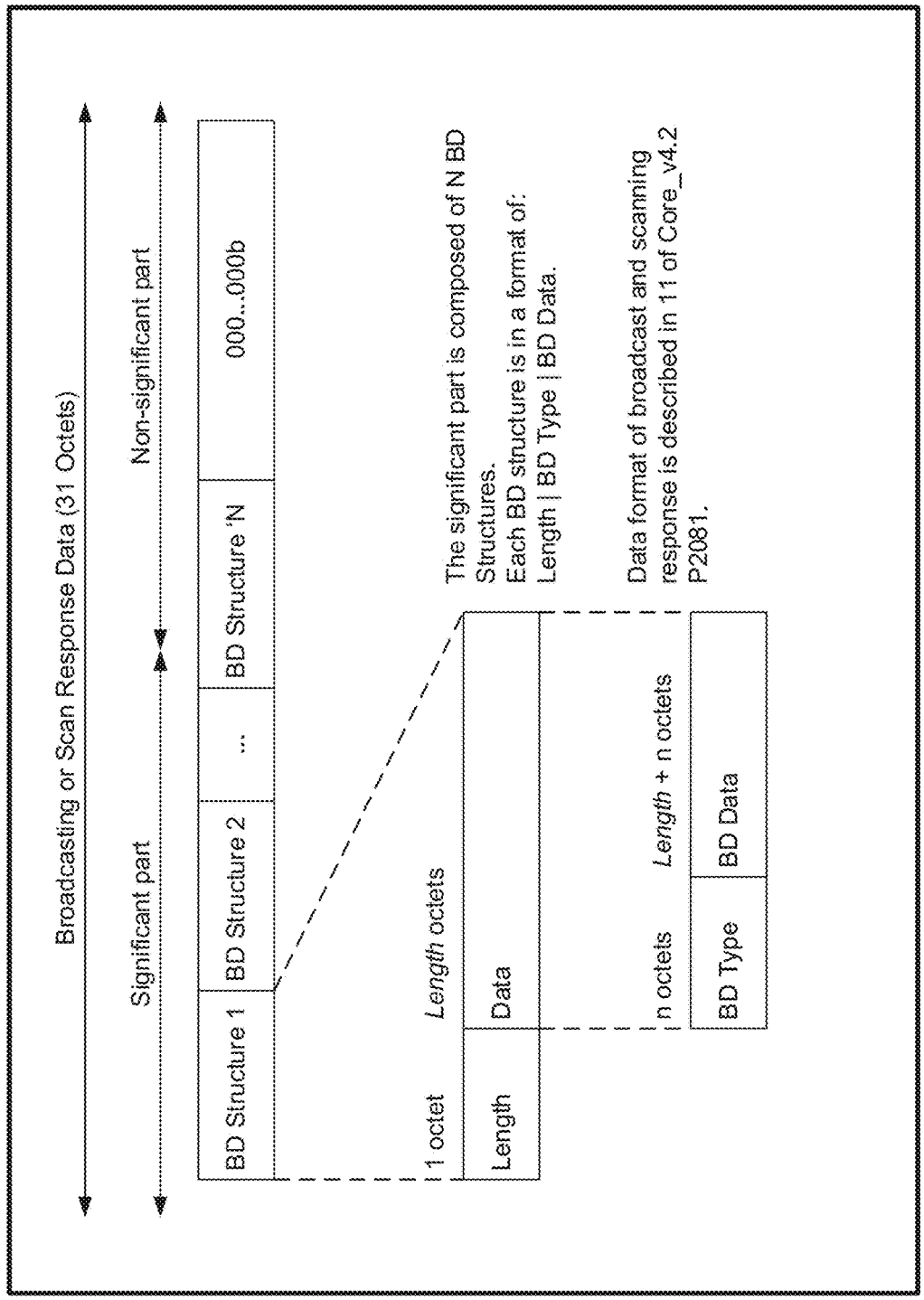
FIG. 5 is a schematic diagram of scanning a corresponding message according to embodiments of the present disclosure.

Referring to FIG. 5, the current connection password index number is returned by using the BD Data in a scanning response data packet of the broadcast packet, and the temporary door-opening password is a one-time door opening password with a short period of validity, which is used for the application scenarios of high security level and free of pairing, and effectively prevents message attack from middleman by the server comparison and authentication and a rolling code mechanism. Different from the pairing codes, the temporary door-opening password realizes door opening through data comparison of an application layer. Data transmission is carried out through a scanning response message and a request message of service discovery. With regard to the security level, the Bluetooth electronic lock device is prevented from repeated message attacks by calculating the accumulative number of comparison and verification errors and actively disconnecting the device.

In the embodiments provided in the present disclosure, it should be understood that the device and the method disclosed can also be realized in other manners. The embodiments of the device described above are merely illustrative, for example, the flow diagram and the block diagram in the drawings show the system architectures, functions and operations that may be implemented according to the devices, methods and computer program products in the various embodiments of the present disclosure. In this regard, each block in the flow diagram or block diagram may represent a module, a program segment or a portion of the codes, and the module, the program segment or the portion of the codes comprise one or more executable instructions for implementing a specified logical function. It should also be noted that in some alternative implementations, the functions noted in the blocks can also occur in an order different from the order indicated in the figures. For example, two consecutive blocks actually can be executed substantially in parallel, or they may sometimes be executed in a reverse order, which is determined according to the functions involved. It should further be noted that each block in the block diagram and/or the flow diagram and a combination of the blocks in the block diagram and/or the flow diagram can be implemented by a special hardware-based system that executes specified functions or actions, or can be implemented by a combination of special hardware and computer instructions.

In addition, individual functional modules in various embodiments of the present disclosure can be integrated together to form an independent part, or each of the modules can exist independently, or two or more modules can be integrated to form an independent part.

When implemented in the form of software functional modules and sold or used as independent products, the functions can be stored in a computer readable storage medium. Based on such understanding, the essence of the technical solution of the present disclosure, or the part of the technical solution that makes contributions to the prior art, or a part of the technical solution can be embodied in the form of a software product, which is stored in a storage medium, comprising some instructions to enable one computer device (which can be a personal computer, a server, a network device or the like) to execute all or some of the steps of the methods in the various embodiments of the present disclosure. The foregoing storage medium includes a USB flash disk, a mobile hard disk, a read-only memory (ROM), a random access memory (RAM), a magnetic disk, an optical disk, or any other medium that can store program codes.

In the application method of a Bluetooth low-energy electronic lock based on built-in offline pairing passwords described in the present disclosure, data propagation of some of the public keys or public addresses is carried out through a scanning response packet of a broadcast packet, the mobile phone APPs run in a Bluetooth server mode, the Bluetooth electronic lock works in a Bluetooth client mode, the Bluetooth electronic lock periodically sends a broadcast packet of random address, and the Bluetooth electronic lock has a set of temporary door-opening passwords of random algorithm built in after its manufacture; and during the initialization process, the Bluetooth electronic lock uploads the built-in temporary door-opening password set, with the random algorithm, through the relational data of application services and the public address of the Bluetooth electronic lock.

The above description is only preferred embodiments of the present disclosure, but the scope of protection of the present disclosure is not limited thereto. Any equivalent substitutions or changes made by those skilled in the art within the technical scope disclosed by the present disclosure according to the technical solutions and the inventive concepts of the present disclosure shall be covered by the scope of protection of the present disclosure.

INDUSTRIAL APPLICABILITY

The embodiments of the present disclosure provide an application method of a Bluetooth low-energy electronic lock based on built-in offline pairing passwords, an interactive unlocking method of a Bluetooth electronic lock, and an electronic lock system. By pre-configuring multiple password sets in the Bluetooth electronic lock, when interactive unlocking is performed, the Bluetooth lock indicates the index of the currently used password to the mobile terminal, the mobile terminal requests a corresponding password from the server according to the index and sends the password to the Bluetooth lock for verification, unlocking is performed after the verification is successful by the Bluetooth lock, and the currently used password is identified as invalid, so that a new set of passwords will be used in the next interactive unlocking. In this way, even if one unlocking password is stolen by a malicious user during one unlocking process, the unlocking password cannot be used in the next unlocking process, which ensures the security of the unlocking process.

The invention claimed is:

1. An application method of a Bluetooth low-energy electronic lock based on built-in offline pairing passwords, comprising steps of:
   Step 1, initializing a built-in temporary password set of a Bluetooth electronic lock after the Bluetooth electronic lock leaves a factory;
   a) uploading a universally unique identifier (UUID), geographic address/location information and installation time of the electronic lock device through an application (APP) for configuration in a mobile phone;
   b) a cloud server generating 100 sets of 16-bit temporary passwords through an obfuscation algorithm; and
   c) the APP for configuration in the mobile phone, downloading the 100 sets of 16-bit temporary passwords and storing the same into an on-chip memory of the Bluetooth electronic lock;

Step 2, the Bluetooth electronic lock broadcasting a random device address periodically when in use;

Step 3, a mobile-phone temporary-door-opening APP initiating a device scanning request of the Bluetooth electronic lock;

Step 4, the Bluetooth electronic lock returning to the mobile-phone temporary-door-opening APP an index number of a temporary door-opening password, with the index number having 2 bytes arranged in a disordered manner, wherein the temporary door-opening password is one of the 100 sets of 16-bit temporary passwords;

Step 5, the mobile-phone temporary-door-opening APP querying a currently-used temporary door-opening password from the cloud server through the index number, with the currently-used temporary door-opening password corresponding to the index number;

Step 6, the cloud server returning through a database a preset temporary door-opening password corresponding to the index number, a UUID and a unique public address of the electronic lock corresponding to the geographic address/location information;

Step 7, performing pairing-free device connection through the public address, and the mobile-phone temporary-door-opening APP initiating a device service discovery request, with the service discovery request having a message data segment carrying the UUID and the temporary door-opening password;

Step 8, the electronic lock receiving the UUID and the temporary door-opening password which are returned from the cloud server to the mobile-phone temporary-door-opening APP and determining, by comparison, whether the currently-used temporary door-opening password which is built in the electronic lock and corresponding to the index number is identical to the temporary door-opening password which is returned from the cloud server to the mobile-phone temporary-door-opening APP, wherein if the currently-used temporary door-opening password which is corresponding to the index number is identical to the temporary door-opening password which is returned from the cloud server to the mobile-phone temporary-door-opening APP, the electronic lock performs an unlocking action, and scrolls, after a door is temporarily opened successfully, a temporary door opening password index table, and identifies the temporary door opening password as invalidated.

2. The application method of a Bluetooth low-energy electronic lock based on built-in offline pairing passwords according to claim 1, wherein in Step 8, if the currently-used temporary door-opening password which is corresponding to the index number is identical to the temporary door-opening password which is returned from the cloud server to the mobile-phone temporary-door-opening APP, a door opening operation is performed directly, and a service discovery reply message containing door opening success information data is returned to the mobile-phone temporary-door-opening APP.

3. The application method of a Bluetooth low-energy electronic lock based on built-in offline pairing passwords according to claim 1, wherein in Step 8, if the currently-used temporary door-opening password which is corresponding to the index number is not identical to the temporary door-opening password which is returned from the cloud server to the mobile-phone temporary-door-opening APP, a service discovery request message, deemed as a normal service discovery request message, is processed.

4. The application method of a Bluetooth low-energy electronic lock based on built-in offline pairing passwords according to claim 1, wherein if the currently-used temporary door-opening password which is corresponding to the index number is not identical to the temporary door-opening password which is returned from the cloud server to the mobile-phone temporary-door-opening APP for three times, the electronic lock actively terminates a connection with the mobile phone, and refuses the mobile phone connection for 10 minutes.

5. An interactive unlocking method of a Bluetooth electronic lock applied to an electronic lock system comprising a cloud server, a mobile terminal and a Bluetooth electronic lock, with the Bluetooth electronic lock and the cloud server pre-storing a same password table in which multiple sets of passwords and index numbers corresponding to the respective sets of passwords are recorded, wherein the method comprises steps of:

the mobile terminal sending a device scanning request to a Bluetooth electronic lock corresponding to the mobile terminal through Bluetooth communication;

the Bluetooth electronic lock receiving the device scanning request, selecting one set of valid passwords from the pre-stored multiple sets of passwords as a first password, and sending an index number of the first password to the mobile terminal;

the mobile terminal sending the received index number to the cloud server;

the mobile terminal receiving a second password which is responded by the cloud server according to the index number and is corresponding to the index number, and sending the second password to the Bluetooth electronic lock; and the Bluetooth electronic lock determining, by comparison, whether the first password is identical to the second password, wherein if the first password is identical to the second password, a current unlocking action is performed by the Bluetooth electronic lock and the first password used for the current unlocking action is identified as invalid or deleted.

6. The method according to claim 5, wherein the step of the mobile terminal receiving a second password which is responded by the cloud server according to the index number and is corresponding to the index number and sending the second password to the Bluetooth electronic lock comprises:

the mobile terminal receiving the second password and a universally unique identifier (UUID) of the Bluetooth electronic lock, with the second password responded by the cloud server according to the index number and corresponding to the index number, and sending the second password and the UUID to the Bluetooth electronic lock;

the step of the Bluetooth electronic lock determining by comparison whether the first password is identical to the second password comprises:

the Bluetooth electronic lock determining by comparison whether the first password is identical to the second password, and whether the UUID sent by the mobile terminal is identical to the UUID of the Bluetooth electronic lock itself, wherein if the first password is identical to the second password and the UUID sent by the mobile terminal is identical to the UUID of the Bluetooth electronic lock itself, the unlocking action is performed.

7. The method according to claim 5, wherein after the step of the Bluetooth electronic lock determining by comparison whether the first password is identical to the second password, the method further comprises:
  recording that the comparison of the mobile terminal is unsuccessful, if the first password is not identical to the second password; and
  terminating the communication with the mobile terminal and refusing to establish the communication with the mobile terminal for a preset duration, when recorded number of times of unsuccessful comparison of the mobile terminal reaches a preset number.

8. The method according to claim 5, wherein the step of the mobile terminal sending a device scanning request to a Bluetooth electronic lock corresponding to the mobile terminal through Bluetooth communication comprises:
  the Bluetooth electronic lock broadcasting a random device address of the Bluetooth electronic lock periodically; and
  the mobile terminal receiving the random device address broadcast by the Bluetooth electronic lock, and sending a scanning request to the Bluetooth electronic lock according to the random device address.

9. The method according to claim 8, wherein the step of the mobile terminal receiving a second password which is responded by the cloud server according to the index number and is corresponding to the index number and sending the second password to the Bluetooth electronic lock comprises:
  the mobile terminal receiving the second password responded by the cloud server according to the index number and corresponding to the index number, and a public address of the Bluetooth electronic lock; and
  the mobile terminal initiating a service discovery request to the Bluetooth electronic lock according to the public address, with the service discovery request carrying the second password.

10. The method according to claim 5, wherein the step of the Bluetooth electronic lock sending an index number of the first password to the mobile terminal comprises:
  the Bluetooth electronic lock, as to the scanning request, replying to the mobile terminal with a scanning response, with the scanning response carrying an index number of the first password.

11. The method according to claim 5, wherein after the unlocking action is performed, the method further comprises:
  the Bluetooth electronic lock sending a successful unlocking prompt to the mobile terminal.

12. The method according to claim 5, wherein the step of the Bluetooth electronic lock determining by comparison whether the first password is identical to the second password comprises:
  the Bluetooth electronic lock determining by comparison whether the first password is identical to the second password,
  wherein if the first password is identical to the second password, binding to the mobile terminal is not performed and an unlocking action is performed, and the password used for the current unlocking action is identified as invalid or deleted.

13. An electronic lock system, comprising a cloud server, a mobile terminal and a Bluetooth electronic lock, wherein the Bluetooth electronic lock and the cloud server pre-store a same password table in which multiple sets of passwords and index numbers corresponding to the respective sets of passwords are recorded; and when interactive unlocking is performed:
  the mobile terminal sends a device scanning request to a Bluetooth electronic lock corresponding to the mobile terminal through Bluetooth communication;
  the Bluetooth electronic lock receives the device scanning request, selects one set of valid passwords from the pre-stored multiple sets of passwords as a first password, and sends an index number of the first password to the mobile terminal;
  the mobile terminal sends the received index number to the cloud server;
  the mobile terminal receives a second password, which is responded by the cloud server according to the index number and is corresponding to the index number, and sends the second password to the Bluetooth electronic lock; and
  the Bluetooth electronic lock determines by comparison whether the first password is identical to the second password, wherein if the first password is identical to the second password, a current unlocking action is performed by the Bluetooth electronic lock, and the first password used for the current unlocking action is identified as invalid or deleted.

14. The electronic lock system according to claim 13, wherein when receiving a second password, which is responded by the cloud server according to the index number and is corresponding to the index number, the mobile terminal receives a universally unique identifier (UUID) of the Bluetooth electronic lock sent by the cloud server, and the mobile terminal sends the second password and the UUID to the Bluetooth electronic lock; and
  the Bluetooth electronic lock determines by comparison whether the first password is identical to the second password and whether the UUID sent by the mobile terminal is identical to a UUID of the Bluetooth electronic lock itself, wherein if the first password is identical to the second password and the UUID sent by the mobile terminal to the UUID of the Bluetooth electronic lock itself, an unlocking action is performed.

15. The electronic lock system according to claim 13, wherein if detecting that the first password is not identical to the second password, the Bluetooth electronic lock records that pairing of the mobile terminal is unsuccessful; and when recorded number of times of unsuccessful comparison of the mobile terminal reaches a preset number, the communication with the mobile terminal is terminated, and the communication with the mobile terminal will be refused to be established for a preset duration.

16. The electronic lock system according to claim 13, wherein the Bluetooth electronic lock is configured to broadcast a random device address of the Bluetooth electronic lock periodically; and the mobile terminal is configured to receive the random device address broadcast by the Bluetooth electronic lock, and send a scanning request to the Bluetooth electronic lock according to the random device address.

17. The electronic lock system according to claim 16, wherein when receiving the second password, which is responded by the cloud server according to the index number and is corresponding to the index number, the mobile terminal further receives a public address of the Bluetooth electronic lock sent by the cloud server; and the mobile terminal initiates a service discovery request to the Bluetooth electronic lock according to the public address, with the service discovery request carrying the second password.

18. The electronic lock system according to claim 13, wherein when sending an index number of the first password to the mobile terminal, the Bluetooth electronic lock, as to the scanning request, replies to the mobile terminal with a scanning response, with the scanning response carrying an index number of the first password.

19. The electronic lock system according to claim 13, wherein after the unlocking action is performed, the Bluetooth electronic lock sends a successful unlocking prompt to the mobile terminal.

20. The electronic lock system according to claim 13, wherein the Bluetooth electronic lock does not perform an operation of being bound to the mobile terminal.

* * * * *